Patented Mar. 1, 1949

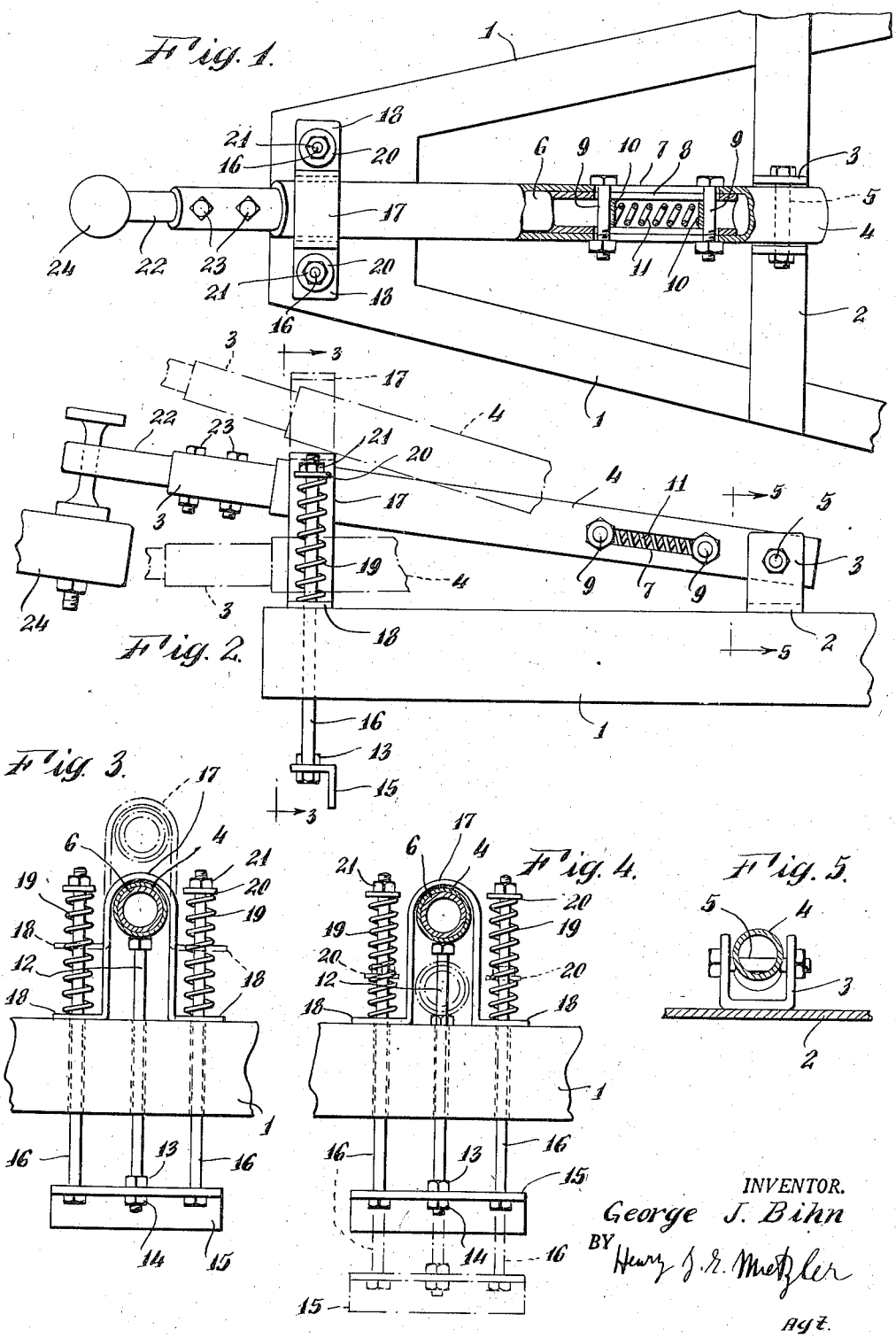

2,463,140

UNITED STATES PATENT OFFICE 2,463,140

TRAILER COACH SPRING HITCH

George J. Bihn, Fort Recovery, Ohio

Application January 8, 1948, Serial No. 1,143

2 Claims. (Cl. 280—33.9)

This invention relates to highway vehicles and more particularly to towing couplers for pivotally connecting an automobile to a trailer.

The primary object of the present invention is to provide a new trailer hitch so constructed and the parts thereof so cooperatively arranged that the shock caused by sudden acceleration and stopping is cushioned for eliminating strain on the trailer and jerking motions applied to occupants without interfering with a freedom of horizontal and vertical motions of the one vehicle with respect to the other.

Another object of the present invention is the provision of a trailer coach spring hitch of the character described which is adapted to reduce to a minimum the shocks between automobile and trailer, and which will remain tight and will not rattle during a long period of use.

A further object of the present invention is the provision of a trailer coach spring hitch of the character described which consists of only a few simple parts which can be manufactured and assembled easily and inexpensively, but which is sturdy, durable, and well adapted to withstand the rough usage to which devices of this type frequently are subjected.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings:

Figure 1 is a top plan view of a preferred embodiment of my invention;

Fig. 2 is a side elevation of the same;

Fig. 3 is a cross-sectional view on the line 3—3 of Fig. 3;

Fig. 4 is a cross-sectional view as Fig. 3 but showing the various movable parts in a different position; and Fig. 5 is a cross-sectional view on the line 5—5 of Fig. 2.

Similar reference characters refer to similar parts throughout the several views.

In the drawing the numeral 1 denotes a fraction of the front portion of the frame of a trailer which is provided with a cross-bar 2 in the usual manner. A U-shaped bracket 3 is secured to the cross-bar 2, and an end portion of a pipe 4, which I call in this specification the "outer pipe," is vertically tiltably attached to the part 3 by means of a cross-bolt 5 extended therethrough. A pipe 6, which I will call the "inner pipe," is telescopically slidable in the outer pipe 4, and both pipes 4 and 6 are provided with opposite registering slots 7 and 8, as may be seen in Figs. 1 and 2. A pair of studs 9 is extended through the extremities of the slots 7 and 8; and a pressure spring 11, having washers or disks 10 at its extremities, is interposed between the studs 9.

A vertical center bolt 12 is extended through, and slidable in, the front extremity of the frame 1 beneath the front end portion of the outer pipe 4, and has a cross-bar 15 of angle iron or the like secured to its threaded lower end portion by means of nuts 13 and 14. A pair of longitudinal vertical bolts 16, having a head on their lower extremities and nuts 21 as well as washers 20 at their threaded upper end portions, are vertically slidable in and extended through the front end portion of the frame 1 and the flanges 18 of a U-shaped saddle piece 17. The latter encompasses the upper section of the front end portion of the outer pipe 4. Springs 19 are interposed between the flanges 18 and the washers 20. A rod 22 is secured to the inner pipe 6 by means of screws 23 or the like and is connected by means of the usual ball and socket joint 24 to the automobile (not shown).

The longitudinal shocks are absorbed or at least cushioned by the spring 11, while the angular upward movement of the draw bar, which consists of the parts 4, 6 and 22, are cushioned by the parts 16, 17 and 19 in the manner indicated in dash-and-dotted lines in Fig. 3. The angular downward movements of said draw bar are cushioned by the parts 12, 15, 16 and 19 in the manner indicated in Fig. 4 by dash-and-dotted lines. In this way the smoothest possible movement of the trailer is attained.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A trailer coach spring hitch comprising a hollow longitudinal draw bar member tiltably secured to the trailer frame, a second longitudinal draw bar member telescoped into the first mentioned member and being provided with a mounting adapted to be attached to an automobile, resilient means adapted for limiting the relative longitudinal movement between said members being interposed between said members, a U-shaped saddle piece encompassing the front portion of said first mentioned member being vertically slidable on bolts which are vertically slidable on and extended through the front end of the trailer frame, a vertical center bolt extending through the front end of the trailer frame beneath said first mentioned member having its lower extremity secured to a cross bar beneath the trailer frame, and resilient means being interposed between said saddle piece and the upper extremities of said first mentioned bolts, the latter having their lower end portions extended through said cross bar, all substantially as described.

2. A device of the character described comprising an outer pipe vertically tiltably secured to the trailer frame and being provided with a pair of registering longitudinal slots, an inner pipe telescoped into said outer pipe and being provided with a mounting adapted to be attached to a pulling vehicle and with slots which register with the slots in said outer pipe, a pressure spring being provided in the slotted portion of said inner pipe between a pair of studs which are extended through the extremities of said registering slots, a U-shaped saddle piece encompassing the front portion of said outer pipe being vertically slidable on bolts which are vertically slidable on and extended through the front end of the trailer frame, a vertical center bolt extending through the front end of the trailer frame beneath said outer pipe having its lower extremity secured to a cross bar beneath the trailer frame, and resilient means being interposed between said saddle piece and the upper extremities of said first mentioned bolts, the latter having their lower end portions extended through said cross bar, all substantially as described.

GEORGE J. BIHN.

REFERENCES CITED

The following references are of record in the file of this patent:

UNITED STATES PATENTS

| Number | Name | Date |
|---|---|---|
| 2,064,615 | Kuchor | Dec. 15, 1936 |